United States Patent [19]
Shoji et al.

[11] Patent Number: 4,619,963
[45] Date of Patent: Oct. 28, 1986

[54] RADIATION SHIELDING COMPOSITE SHEET MATERIAL

[75] Inventors: Hisataka Shoji; Shigehiro Ouchi, both of Otsu, Japan

[73] Assignee: Toray Industries, Inc., Tokyo, Japan

[21] Appl. No.: 626,782

[22] Filed: Jul. 2, 1984

Related U.S. Application Data

[62] Division of Ser. No. 469,283, Feb. 24, 1983, Pat. No. 4,485,838.

[51] Int. Cl.[4] .......................... C08K 3/00; D02G 3/00
[52] U.S. Cl. .................................... 524/439; 428/292; 428/372; 428/379; 523/137; 524/80; 525/205
[58] Field of Search ......................... 524/80, 439, 401; 428/372, 375, 379, 522, 606, 607, 570, 292; 525/205

[56] References Cited

U.S. PATENT DOCUMENTS

| | | | |
|---|---|---|---|
| 2,168,381 | 8/1939 | Woodford | 428/570 X |
| 2,312,921 | 3/1943 | Lubow | 524/439 X |
| 2,367,296 | 1/1945 | Lutz | 524/439 X |
| 2,986,533 | 5/1961 | Kurtz | 428/570 X |
| 3,185,751 | 5/1965 | Sutton | 524/439 X |
| 3,427,264 | 2/1969 | Forster et al. | 524/439 |

*Primary Examiner*—Lorraine T. Kendell
*Attorney, Agent, or Firm*—Wegner & Bretschneider

[57] ABSTRACT

A radiation shielding composite sheet material contains lead fibers of more than 99% purity and containing 50 to 500 ppm tin. The fibers are of mean length of 0.5 to 1.3 mm and are imbedded in a synthetic resin, such that the composite sheet has a specific gravity greater than 4.0.

7 Claims, 3 Drawing Figures

RADIATION SHIELDING COMPOSITE SHEET MATERIAL

This application is a division of Ser. No. 469,283, filed Feb. 24, 1983 U.S. Pat. No. 4,485,838.

FIELD OF THE INVENTION

The present invention relates to a method of manufacturing lead fiber of extremely fine diameter and providing excellent flexibility, covering power, and anticorrosive property. The present invention also relates to methods for manufacturing said lead fiber. The present invention further relates to composite material for radiation shielding material comprising said lead fiber that provides an excellent shielding power even though it is of thin construction.

BACKGROUND OF THE INVENTION

Prior methods for melt spinning of lead have already been published. Such lead fibers have already been presented for application to sound control and radiation shielding materials. Diameters of lead fibers made by any of the conventional melt spinning methods range from approx. 150 to 200 microns, whereas lead fibers having less than 60 microns in the diameter are not yet been commercially available.

This is because, when fine lead fibers are extruded through a very small hole, either dripping or clogging of the hole occurs within a very short time, or the output may sharply decrease, and as a result, such very fine lead fibers cannot stably be spun. This problem is particularly noticeable in the process of spinning high-purity lead, for example, more than 99.9% of the purity.

A preceding invention under the patent application publication No. TOKUKOSHO 49-16168, disclosed methods for eliminating such a defect in spinning lead. Said methods prevents spinneret holes from clogging by adding alloy elements so that the spinning of lead can be improved.

Nevertheless, said prior art needs addition of a large amount of a metal element; for example, 0.1 to 40% (by weight) of tin must be added, thus eventually resulting in lowered lead contents in the made-up fiber.

It is vitally important to inhibit generating even the slightest amount of characteristic X-rays when such a material comprising lead fibers is applied to the radiation shielding. In addition, since the higher the lead content in the fiber, the higher the radiation shielding effect, it is not desirable to use such lead fibers containing much metal element for radiation shielding.

SUMMARY OF THE INVENTION

To overcome such defects in the preceding art, the present invention has been achieved for making lead fibers having sufficient radiation shielding power.

The present invention particularly relates to lead fibers containing 50 to 500 ppm of tin, more particularly with a diameter below 60 microns. The present invention also relates to a radiation shielding composite material comprising said lead fibers. Such fine lead fibers can be manufactured by applying 50 to 500 ppm of tin to the spinning material.

The present invention provides such a new technique which stably provides such lead fibers capable of satisfactorily shielding not only sound but also radiation. In addition, due to the very fine construction, such lead fibers provided by the present invention are extremely flexible; thus they are suitable for application to a variety of uses. Also these fibers are highly resistive to corrosion as another advantageous feature.

DETAILED DESCRIPTION OF THE INVENTION

Figure 1A:
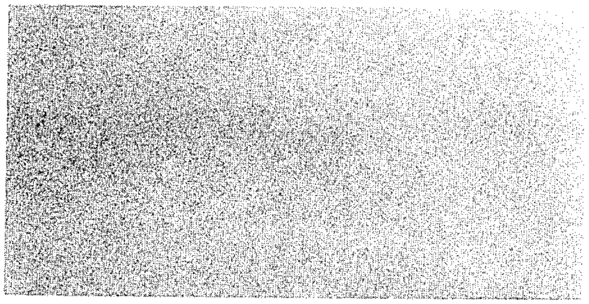
FIG. 1 shows X-ray photographs of sheets (A) and (B) obtained by example 7 of the present invention.

Lead fiber embodied by the present invention contains 50 to 500 ppm of tin, preferably 100 to 200 ppm.

While checking the spinneret hole clogging problem which occurred on spinning of lead fibers, we detected that very peculiar function of the tin element. It permits production of very thin lead fibers. Moreover, the fine lead fibers of high purity can expand the potential use of lead fibers and also provides an ease of handling.

Conventionally, technically producible lead fibers have a diameter greater than 160 microns, usually around 200 microns. Compared to the sheet comprising such conventional lead fibers, the sheet comprising the lead fibers embodied by the present invention is highly flexible even at dense Xconstruction.

As a further advantage of the fine lead fibers embodied by the present invention, an extremely thin sheet can be produced.

Lead fibers embodied by the present invention can be produced by melt spinning.

First, tin is added to lead so that the amount of tin is within a range of 50 to 500 ppm. Since tin is melted at about 232° C., the mixture can be completely melted at 327° C., the melting point of lead. Then, the mix fluid can be spun into fibers after flowing through holes having a desired diameter.

Since the spinneret holes can be prevented from clogging by a small amount of tin element, any hole having a very fine diameter can effectively be used. As a result, lead fibers having 60 microns, or 50 microns or, more preferably, below 30 microns in diameter can easily be spun, and yet, such lead fibers are extremely resistive to corrosion due to the characteristics of tin.

Such a satisfactory effect will become quite significant if only a minimum of 50 ppm of tin is contained in the lead fiber, whereas if the tin contents are below 50 ppm, from possible clogging of the spinneret is not effectively prevented.

Conversely, if the lead fiber contains more than 500 ppm of tin element, though such advantageous effect as mentioned above will be achieved, it will also cause the tin element to adversely generate characteristic X-rays. However most metals other than tin also generate characteristic X-rays. To prevent generation of characteristic X-rays, it is preferable that the lead content of the fiber is more than 99%, preferably 99.9%.

Although tin may be mixed with lead either as the element or as a compound, it must be added to said mix so that 50 to 500 ppm of the tin element is present.

The lead fiber embodied and produced by the present invention can be very fine, highly effective for radiation shielding, and very flexible.

Such lead fibers can easily be fabricated into any sheet which may be thin, thick, dense, or coarse in composition. The made-up sheet is extremely resistive to corrosion and provides easy handling due to its flexible characteristics.

There are a wide variety of uses for the lead fibers embodied by the present invention, the details of which are described below.

First, we tried to make up composite material comprising said lead fiber as a chopped fiber and resin. After the experiments, it was found that the fine lead fibers embodied by the present invention were apt to entangle each other too easily, causing aggregation, and then they turned out to be lumps. As a result, it was very difficult to disperse them uniformly in a composite material. It was eventually made clear that, in order to uniformly disperse the fine lead fibers in the resin, the length of said lead fibers should be made shorter than the conventional lead fibers having thick diameters. This fact was proven only after such extremely fine lead fibers were successfully obtained.

If the mean length of the fine lead fibers is more than 1.3 mm, when they are slightly pressed during production, the lead fibers obtained aggregate and easily turn to lumps. During the mixing process with resin, these fibers also turn to lumps, resulting in very poor dispersibility. On the other hand, when we processed lead fibers having less than 0.5 mm mean length, these fibers easily flew up in the air and, as a result, were unacceptable for use due to great inconvenience in handling.

Using a rotary cutter next to the spinning facilities, the spun fibers were cut immediately after the solidification during spinning, and then they are filtered through a sieve adjacent to the rotary cutter and only the lead fibers having the predetermined length were selected.

It should be understood, however, that the embodiment of the present invention are not limited to the methods for manufacturing the lead fibers described above.

A still further embodiment of the present invention includes composite material with an extremely effective X-ray shielding power in spite of its thinly fabricated construction, the details of which are described below.

Conventionally, a variety of X-ray shielding sheets made into either garments or aprons are commercially available, wherein said X-ray shielding sheets usually contain powder of lead metal or its compound in a high-polymer.

Nevertheless, such fine powder of lead or its compound cannot properly be blended into resin so that the specific gravity is greater than 3.5. If any additional amount of such power is added, the X-ray shielding sheets will eventually become too weak for use.

Moreover, even in this sheet, the lead equivalent will merely be a value of 0.08 (mm Pb), at the thickness of 0.5 mm, according to the JIS Z-4501 standard test method, which is too low for properly shielding the X-ray.

In addition, such fine powder is obviously hazardous to the human body because the lead dust adversely affects the working site by overall contamination, and yet such environmental contamination cannot be prevented completely.

On the other hand, there is a certain kind of sound-shielding composite material comprising lead fibers having diameters ranging upward from a minimum of 100 microns and normally in a range of 200 to 500 microns. Compared to the lead power mentioned above, said composite material allows a significantly larger amount of the lead additive to be mixed together with high-polymers so that a maximum of 5.5 of the specific gravity can be obtained.

Nevertheless, such a composite material composed of lead fibers with large diameter was eventually found entirely unsuitable for application to X-ray shielding due to innumerable pin holes shown in the X-ray photographs, which were caused by the penetration of X-ray.

In the light of such a fatal defect, we intensively looked for a suitable composite material that could better shield X-ray. We discovered that such lead fibers having specific diameters could effectively satisfy such important needs for shielding the radiation.

The present invention relates to composite materials for shielding X-ray, wherein said composite material is composed of lead fibers blended with synthetic resin, wherein said lead fiber is of a diameter of less than 60 microns and said composite material has a minimum specific gravity of 4.0.

Lead equivalent is often used to compare X-ray shielding power of various materials, where the lead equivalent is represented by "the thickness of lead substrate to which the X-ray shielding power is equivalent". The greater the lead equivalent, the higher the X-ray shielding power.

In order to obtain maximum X-ray shielding power, the lead equivalent value must be increased by providing materials with higher specific gravity, and especially the X-ray absorbing material (lead) must be uniformly dispersed. This is because, even though the lead equivalent value is increased, if there are pin holes that locally allow the X-ray to penetrate the shielding sheet, the sheet is unsuitable for application to X-ray shielding.

The extremely fine lead fibers embodied by the present invention is characterized in that said lead fibers are easy to be homogeneously dispersed into resin, and yet, even though a large amount of said lead fibers is added, both the strength and flexibility inherent to the made-up sheet remain unaffected.

If the diameter of lead fibers exceeds 60 microns, homogeneous dispersibility is lowered; a number of pin holes will be generated locally, allowing the X-ray to easily penetrate the shielding sheet itself.

Any of the thermoplastic and thermosetting resins that is usually applicable to conventional composite materials can also be suitably mixed with lead fibers.

Of these, the thermosetting resins include, for example, epoxy, phenol, unsaturated polyester, and polyimide resins, but are not limited to these. If necessary, either a crosslinking agent, catalyst, or any other additive can be mixed with any of these resins.

The thermoplastic resin includes, for example, polyvinyl chloride, polyolefin, polyamide, polyester. If necessary, any other resins can also be made available. Also, any suitable additive such as plasticizer, filler, thermostabilizer, flame retarder, pigment, etc. can also be conveniently mixed with resins, if necessary.

Composite material comprising the chopped lead fibers and resin embodied by the present invention normally has a specific gravity of a minimum of 4.0, and typically more than 4.5. The lead fibers are homogeneously dispersed in such composite material.

Owing to such an excellent homogeneous quality, lead equivalent measured by the JIS Z-4501 standard test method was significantly higher than that for any of the conventional lead powder blended composite material, and yet, the composite material composed of said lead fibers, is totally free from pin holes that allow the X-ray to penetrate through them.

Particularly, even though the composite material comprising any of the thermosetting resins is made into a very thin sheet having less than 0.5 mm of the thickness, it is provided with a sufficient shielding power against X-ray. In addition, it is very easy to handle owing to its excellent flexibility. Thus, it has a vast variety of applications.

Radiation shielding sheets preferred in the present invention can be made, for example, by the following methods. However, production is not limited to them.

First, lead fibers are mixed, for example, with polyvinyl chloride resin in any desired proportion, to which a suitable plasticizer is added before the mix is completely blended, using, for example, a Banbury mixer. Next, the blended material containing very fine lead fibers is pressed between rolls that are provided with a predetermined gap so that the blended material can be shaped into a sheet.

It is also possible that either woven, knitted or spun-bonded fabric composed of either the natural fiber or man-made fiber is laminated on or in said composite material so that the sheet's strength can be increased. Likewise, such a composite material can be processed in any manner according to the object of use.

Details of the preferred examples of the present invention are described below.

EXAMPLE 1

First, tin metal (Sn shot, made by Fukuda Kinzoku Hakufun Kogyo KK) was added to the melt lead metal (99.9% of minimum purity; sum of the contents of Sb and Sn less than 10 ppm) so that the amount of the Sn ingredient in the lead fiber becomes a value shown in the Table below.

Then, the mixed metals were melted at 385° C. and the melted material fed to the spinning equipment provided with a spinneret comprising 5 holes each having 0.05 mm of the diameter.

Said material was then extruded through the spinneret at 380° C. by pressurized inert gas. Lead fibers each having 30 to 40 microns of the diameter were produced.

We closely observed the condition of the spinning of each example for 2 hours respectively.

For comparison, results of the spinning operations with 30 ppm of tin element and without were tabulated as shown below. As is clear from the table below, according to the methods of the present invention, lead fibers having very high purity were stably produced by merely adding very minimal amount of tin.

Improved effects of the spinning characteristics according to the methods of the present invention are shown below.

| | Sn Contents | Time Until the Nozzle Clogged | Output Status | Spinning Characteristics |
|---|---|---|---|---|
| Example 1 | 50 ppm | No clogging occurred at all. | Mildly lowered. | Satisfactory |
| Example 2 | 140 ppm | No clogging occurred at all. | Output remained constant. | Satisfactory |
| Example 3 | 500 ppm | No clogging occurred at all. | Output remained constant. | Satisfactory |
| Comparative Example 1 | Below 4 ppm | All the holes clogged within 5 min. | Drastically lowered. | Totally Example impossible |
| Comparative Example 2 | 30 ppm | No clogging occurred at all. | Sharply lowered. | Poor Example 2 |

EXAMPLE 4

First, tin metal was added to lead metal (99.9% minimum purity; sum of the contents of Sb and Sn less than 10 ppm) at 345° C. so that the Sn ingredient became 100 ppm. The melted metal was then spun out through the holes each having 0.05 mm of the diameter. A web (having 7.5 kg/m$^2$ of the surface density) comprising very fine lead fibers each having 30 to 40 microns of the diameter, was produced.

Next, 4 sheets of the web were superimposed and put between two sheets of woven cloth to be quilted. A quilted mat having a 30 kg/m$^2$ weight, 30 cm width, and 100 cm length was eventually produced.

This mat was then rolled onto a pipe having 10 cm diameter. Owing to its high flexibility, the mat was enabled to tightly roll onto the pipe. This flexibility is very advantageous for use of radiation shielding from radioactivated pipe.

COMPARATIVE EXAMPLE 3

As with the example 4, lead metal mixture was prepared for spinning. After being melted at 345° C., the metal fluid was spun out through a spinneret having 0.18 mm hole diameter, and a web of lead fibers each having 160 to 170 microns diameter was eventually produced.

Using this spun-bonded fabric, a mat was produced, which had 30 kg/m$^2$ weight, 30 cm width, and 100 cm length.

This mat was rather coarse and less flexible; it was also available for shielding radiation either by hanging or covering. Such a mat, however, could not be tightly wound onto the pipe, resulting in limited usefulness for shielding the radioactivated substance.

EXAMPLE 5

As with the preceding example 4, lead metal mixture was prepared for spinning. After being melted at 345° C., the metal fluid was spun out of a spinneret having 0.05 mm of hole diameter, and a web of lead fibers each having 30 to 40 microns diameter (weight 7.5 kg/m$^2$) was produced.

Using this lead fiber web, a radiation shielding garment having a net weight of 25 kg was experimentally produced. Though it was rather heavy to wear, the waist portion could be tightened easily with a belt due to its own flexibility. This permitted the worker to support the garment with the belt and to reduce the burden on his shoulders. Wear fitness was significantly improved.

On the other hand, when a garment made of lead fibers of 160 to 170 microns diameters was used, due to its own coarseness and less flexibility, the garment could not be held properly with a belt. Accordingly, the entire weight of the garment had to be sustained by the shoulders, causing the tester extreme discomfort. This garment was eventually found unacceptable for use in any working environment.

EXAMPLE 6

Very fine lead fibers each having 30 to 40 microns diameter produced according to example 4 were cut by a cutter in order to obtain chopped fibers. During this process, chopped fibers of several lengths were produced by varying the diameter of the cutter screen.

The relationship between the physical characteristics of said lead fibers and dispersibility in resin represented by Examples 6 and Comparative Examples 4 and 5, is shown in the table below.

It was clearly known from these examples that lead fibers having a mean length in a range from 0.5 to 1.3 mm show excellent dispersibility and handling.

| | Mean Length | Physical Characteristics | Dispersibility in Resin |
|---|---|---|---|
| Example 6 | 1.0 mm | No aggregate occurs even by pressing with a finger. | Excellent |
| Comparative Example 4 | 1.5 mm | Aggregates occurred. | Poorly dispersed and became lumps |
| Comparative Example 5 | 0.3 mm | No aggregate occurs, but easily flies up in air. | Excellent |

EXAMPLE 7

Using a varying amount of lead fibers, a mixture was first prepared by adding these to the PVC resin compound, and after adding plasticizer, the mixture was sufficiently stirred by a Banbury mixer. The mixture was then extruded through a gap of rollers, yielding two pieces of sheet each having 4.2 (sheet A) and 4.7 (sheet B) of the specific gravity.

After analysis based on the JIS Z-4501 standard test method, these sheets were found to have 0.14 (sheet A) and 0.17 (sheet B) of lead equivalent, respectively. They were further photographed by 100 KVP of X-ray tube voltage. As a result, they were satisfactorily evaluated as of homogeneous quality without containing any pin hole at all, providing totally effective radiation shielding characteristics.

COMPARATIVE EXAMPLE 6

Lead oxide powder (PbO with 9.5 of the specific gravity) was first blended into the PVC compound and then a sheet having 0.5 mm of the thickness was prepared.

After the mixed ratio (by volume) was increased to about 35%, the resultant sheet became too weak for use, whereas only when the mix ratio (by volume) was eventually reduced to 26.0%, a sheet suitable for any actual use was obtained, which had a specific gravity of 3.5.

It was however impossible to increase the specific gravity beyond 3.5 because the allowable mix ratio could not be increased any more.

Lead equivalent of the preceding sheet was 0.09, being inferior to other sheets prepared by the preceding examples in respect to radiation shielding power.

In order to obtain the same radiation shielding power as in the preceding examples, the thickness of the sheet had to be expanded by about 1.5 times the original.

It was found extremely difficult to prepare such a thin sheet having satisfactory shielding power against the X-ray penetration if the sheet was prepared using conventional lead powder.

COMPARATIVE EXAMPLE 7

A certain amount of lead fibers each having a diameter of 70 microns and of a length of 1 mm was mixed with PVC resin, with which a sheet having 0.5 mm of the thickness was prepared. In this example, in order to improve the lead equivalent value, the amount of lead fibers was increased in the mixture. As a result, the specific gravity of the sheet was also increased by 0.5 compared to that of the preceding example 7 (sheet A), so that the specific gravity became 4.7.

By increasing the specific gravity, a lead equivalent value of 0.14 was obtained. The lead equivalent value corresponded to that of the example 7.

Figure 2:
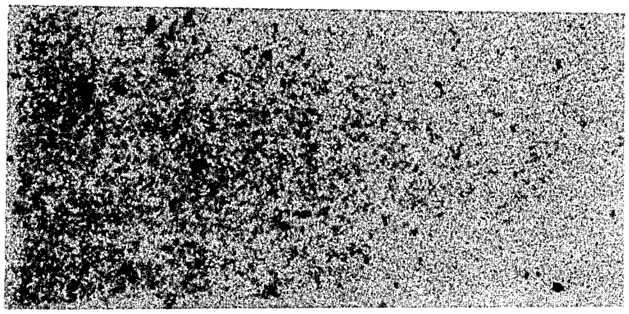
FIG. 2 shows X-ray photographs of the sheet obtained by comparative example 7.

On the other hand, as shown in FIG. 2, a number of pin holes was actually observed by the X-ray photographs, which evidenced that the X-ray actually penetrated the sheet through these holes. And the lead lumps are clearly noticed in the sheet. This means bad dispersibility of the lead fiber.

As a result, the sheet prepared by the procedures shown above was found fatally defective for completely shielding the X-ray.

Figure 1B:
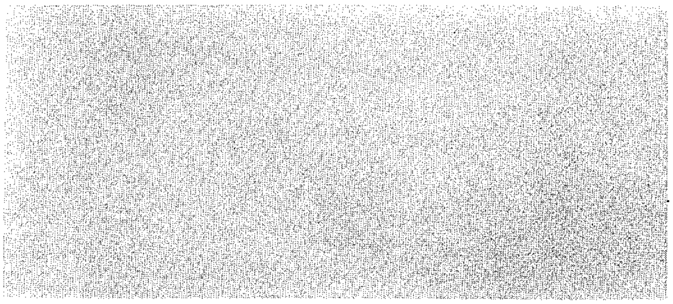

Comparing the effects of the radiation shielding shown in FIG. 2 to those of FIGS. 1 (A) and (B), despite their identical values for specific gravity, FIG. 2 shows white spots evidencing the positions where the X-ray actually penetrated.

Despite its own specific gravity, (A) is totally free from any white spots that exist in FIG. 2. Although (A) allows a little greater amount of X-ray to penetrate through it than (B) does, it eventually proves to be still highly effective in radiation shielding power.

What is claimed is:

1. A radiation shielding composite sheet comprising lead fibers of more than 99% purity having 0.5 to 1.3 mm mean length and of a diameter of less than 60 microns and a synthetic resin, said fibers containing 50 to 500 ppm tin wherein said radiation shielding composite sheet has a specific gravity greater than 4.0.

2. The radiation shielding composite sheet according to claim 1, wherein the lead fibers have a diameter of 30–40 microns.

3. The radiation shielding composite sheet according to claim 1, wherein the synthetic resin is a thermoplastic synthetic resin.

4. The radiation shielding composite sheet according to claim 3, wherein the thermoplastic synthetic resin is polyvinyl chloride.

5. The radiation shielding composite sheet according to claim 1, wherein the synthetic resin is a thermosetting synthetic resin.

6. The radiation shielding composite sheet according to claim 1, wherein the specific gravity is greater than 4.5.

7. The radiation shielding composite sheet according to claim 1, wherein the tin content is 100–200 ppm.

* * * * *